United States Patent [19]
Düring

[11] Patent Number: 5,316,184
[45] Date of Patent: May 31, 1994

[54] FOLDABLE PLASTIC BOTTLE, BLOW MOLD FORM TO MAKE THE BOTTLE, AND METHOD OF MAKING THE BOTTLE

[75] Inventor: Walter Düring, Zürich, Switzerland

[73] Assignee: Düring AG, Dällikon, Switzerland

[21] Appl. No.: 920,784

[22] Filed: Jul. 28, 1992

[30] Foreign Application Priority Data

Aug. 8, 1991 [CH] Switzerland .................. 02347/91

[51] Int. Cl.⁵ ............................................... B65D 35/08
[52] U.S. Cl. .................................. 222/107; 222/215; 249/119; 425/538
[58] Field of Search ............... 222/92, 107, 206, 212, 222/215; 215/1 C; 249/119; 425/538

[56] References Cited

U.S. PATENT DOCUMENTS

| | | |
|---|---|---|
| 1,625,398 | 4/1927 | Schaefer . |
| 2,368,944 | 2/1945 | Parkhurst ................. 222/107 |
| 3,288,334 | 11/1966 | Corsette ................... 222/107 |
| 3,592,885 | 7/1971 | Goins et al. ............... 264/98 |
| 3,926,341 | 12/1975 | Lhoest ..................... 222/105 X |
| 4,674,655 | 6/1987 | Lofgrer et al. ............ 222/103 |
| 4,898,306 | 2/1990 | Pardes ..................... 222/206 |
| 5,080,260 | 1/1992 | Düring ..................... 222/215 X |
| 5,174,458 | 12/1992 | Segati ..................... 222/107 |

FOREIGN PATENT DOCUMENTS 932302  8/1973  Canada ................. 222/107
0204200 12/1986 European Pat. Off. .
0355437  2/1990 European Pat. Off. .

*Primary Examiner*—Andres Kashnikow
*Assistant Examiner*—Joseph A. Kaufman
*Attorney, Agent, or Firm*—Frishauf, Holtz, Goodman & Woodward

[57] ABSTRACT

To place material accumulations, which is unavoidable upon blow-molding a bottle, in a separable two-part blow mold form away from a bottom fold line (2) of the bottle, in which the bottom portion of the bottle is formed with a generally inverted V-shaped depression (3) and the apex of the V defines the bottom fold line, the separating seam (9) in the bottom portion is placed at an angle ($\alpha$) with respect to the bottom fold line (2), a central region of the bottom separating seam intersecting, at least approximately, the bottle axis (17). The mold form has a body separating plane (12) and an end portion separating plane (16, 23, 25) in which the end portion separating plane is angled by the angle ($\alpha$) with respect to the body separating plane. Upon blow-molding, the bottom seam (9) and the bottom fold line (2) will be non-congruent, and material accumulation (11) upon blow-molding the bottle will occur at locations remote from the bottom fold line (2), thus not interfering with folding the bottle along the bottle fold lines (2, 15). This method is suitable for bottles of integral shape, as well as bottles having an integral molded-in handle.

20 Claims, 4 Drawing Sheets

FOLDABLE PLASTIC BOTTLE, BLOW MOLD FORM TO MAKE THE BOTTLE, AND METHOD OF MAKING THE BOTTLE

Reference to related patent, the disclosure of which is hereby incorporated by reference: U.S. Pat. No. 5,080,260, by the inventor hereof.

FIELD OF THE INVENTION

The present invention relates to a foldable plastic bottle, to a method of making the bottle, and to a blow mold for blow-molding the bottle.

BACKGROUND

U.S. Pat. No. 5,080,260, by the inventor hereof, the disclosure of which is hereby incorporated by reference, discloses a bottle made of thin-walled plastic produced by blow-molding process. A bottom part is preformed with an inwardly extending, in cross section essentially V-shaped folded part which defines an elongated inner bottom fold line. The inner bottom fold line merges smoothly with body fold lines extending longitudinally of the bottle. The inner bottom fold line and the longitudinal fold line are in a single plane. The cross section of the bottle may be circular, rectangular, or hexagonal and is unitary with the pouring spout which extends, preferably with a reduced diameter, from the top portion of the bottle. Upon folding the bottle along the seam lines, and expelling all air from the inside, the bottle can be compressed and, upon tightly closing the spout, reduced to small size.

Upon blow-molding such a bottle, a seam will form at the junction of two mold parts. This, unavoidably, results in some thickening of the material. To prevent congruence of the fold with the wall thickness, it has been proposed, as described in the aforementioned patent, to place the separating plane of the blow mold form halves transversely to the longitudinal plane of the bottle. This results in excellent foldability of the bottle.

It has been found that shifting the separating plane of the blow mold in bottles in which a handle is formed inherently and as part of the bottle does not make it possible to place the seam line transversely to the bottom fold, since it would no longer be possible to remove the blow-molded bottle from the blow mold form and, further, the two halves of the blow-mold form would not be mirror-symmetrical. Otherwise, expensive multiple-part special forms, with sliders and the like, would have to be used, which makes manufacture of such a bottle expensive.

If the same folding principle as that described in the earlier U.S. Pat. No. 5,080,260 is carried out in bottles in which the entire separating plane of the bottle halves or, rather, of the mold halves, are placed in a longitudinal plane of the bottle which coincides with a central plane, also including the bottom fold line, the separating thickening of the bottle becomes congruent with the bottom fold line. This is undesirable, since it interferes with folding. In the manufacture of bottles of this type, a hot extruded tube of plastic material is gripped by two form halves, and compressed in the region of the pinch edges of the mold halves. At the ends of the respective pinch seams, then, material from the plastic tube will accumulate. This material has roughly crescent-moon shape. The thickening of the material in the region of the bottom of the bottle can be a multiple, and it has been found typically up to six times the normal wall thickness. This accumulation of material, practically unavoidable in blow-molding, interferes with folding of the bottom of the bottle along its longitudinal plane; in extreme cases, and excessive accumulation of material, may make folding the bottle impossible. The accumulation of material upon blow-molding the bottle is located inwardly, at least in part, within the inverted V-shaped bottom of the bottle. Thus, the thickening of the material does not enhance the support of the bottle, for example on a support surface such as a shelf or table, and does not contribute to stabilizing the weight of the bottle.

THE INVENTION

It is an object to make a blow-molded plastic bottle which has an inwardly folded bottom, to permit folding the bottle flat, while avoiding accumulation of the material from which the bottle is made at the fold line of the bottom, while retaining severability of the blow-molding form in a central plane passing through an axis of the bottle, at least in a region remote from the bottom thereof; and, further, to permit blow-molding bottles having a molded-in handle, and in which the stability of the bottle is enhanced over bottles of the prior art.

Briefly, the foldable blow-molded bottle of plastic material defines a bottle axis. The bottom portion is formed with a generally inwardly facing V-shaped depression or recess. The apex of the V defines a bottom fold line. In accordance with a feature of the invention, the bottom seam which, in the blow mold, forms the separating line of two mold halves, extends at an angle $\alpha$ with respect to the bottom fold line; in a central region, the bottom seam intersects, at least approximately, the bottle axis. Thus, the bottom seam and the bottom fold line are non-congruent, and material accumulation upon blow-molding the bottle will occur remote from the fold line. Desirably, the angle is selected to be between about 25° to 45°, which will then place material accumulation at positions which contribute to the stability of the bottle when standing on the support surface.

The process of making the bottle, in accordance with a feature of the invention, requires furnishing two mold halves, in which the separating planes are not continuously flat but, rather, have a stepped appearance with an inclined further separating surface which, when the bottle is made, forms the separating seam at the bottom of the bottle, intersecting, at least approximately, the bottle axis.

By repositioning the seam at the bottom, the bottom fold line will be free from material thickening, unavoidable in blow-molding bottles using two-part molds. Additionally, the stability of the bottle when standing on a support is improved, which is particularly important in high-volume bottles, which are filled with liquid, for example bottles holding one to a plurality of liters of contents, and which, before and after filling, should be capable of being folded flat, to decrease shipping volume, or disposal volume of the empty bottles. The shape of the blow molds in the region of the neck and the body of the bottle can be unchanged from that of the prior art, and permits manufacture of bottles which have a handle molded therein. The unavoidably occurring, essentially quarter or crescent moon shaped material accumulations will be positioned laterally of the bottom fold line and, thus, will not interfere with folding a bottle prior to and after containing a fluid filling.

DRAWINGS

DETAILED DESCRIPTION

Figure 1:
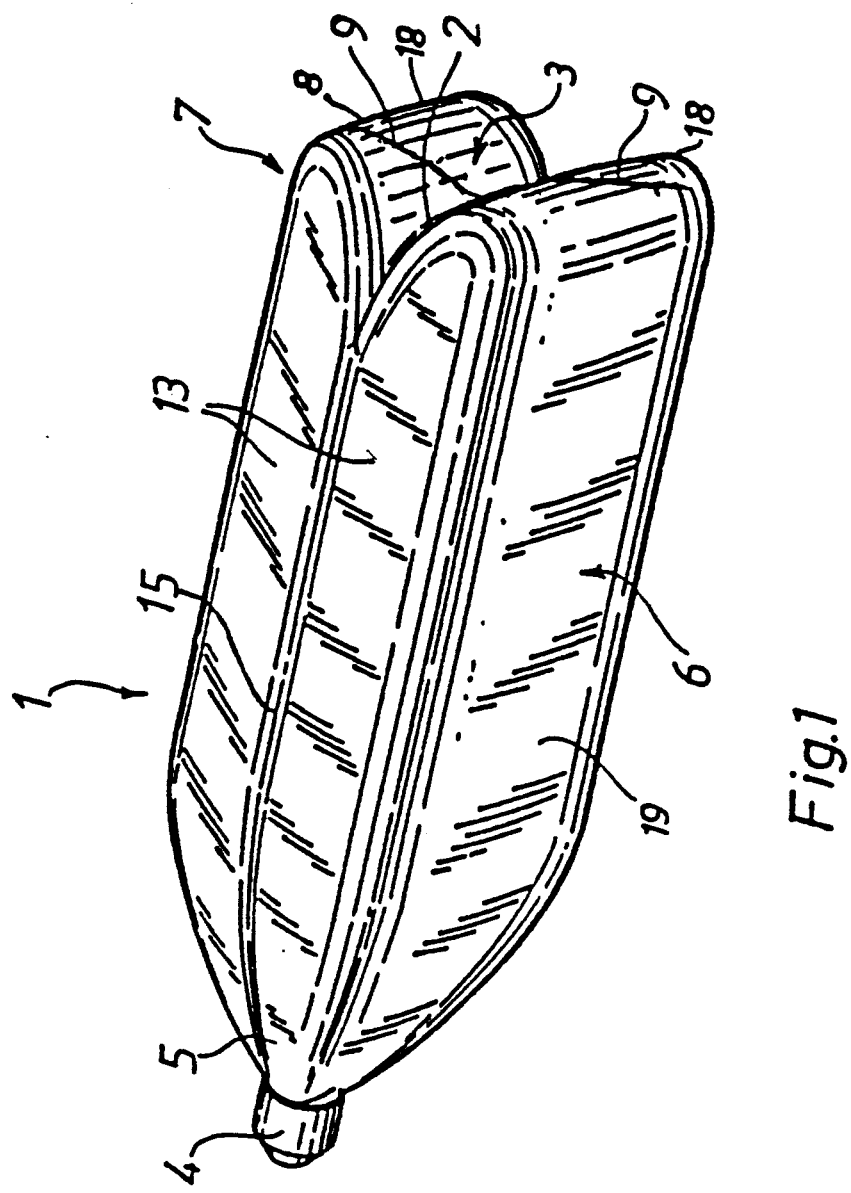
FIG. 1 is a generally perspective view of the bottle in accordance with the present invention, without a handle.
Figure 2:
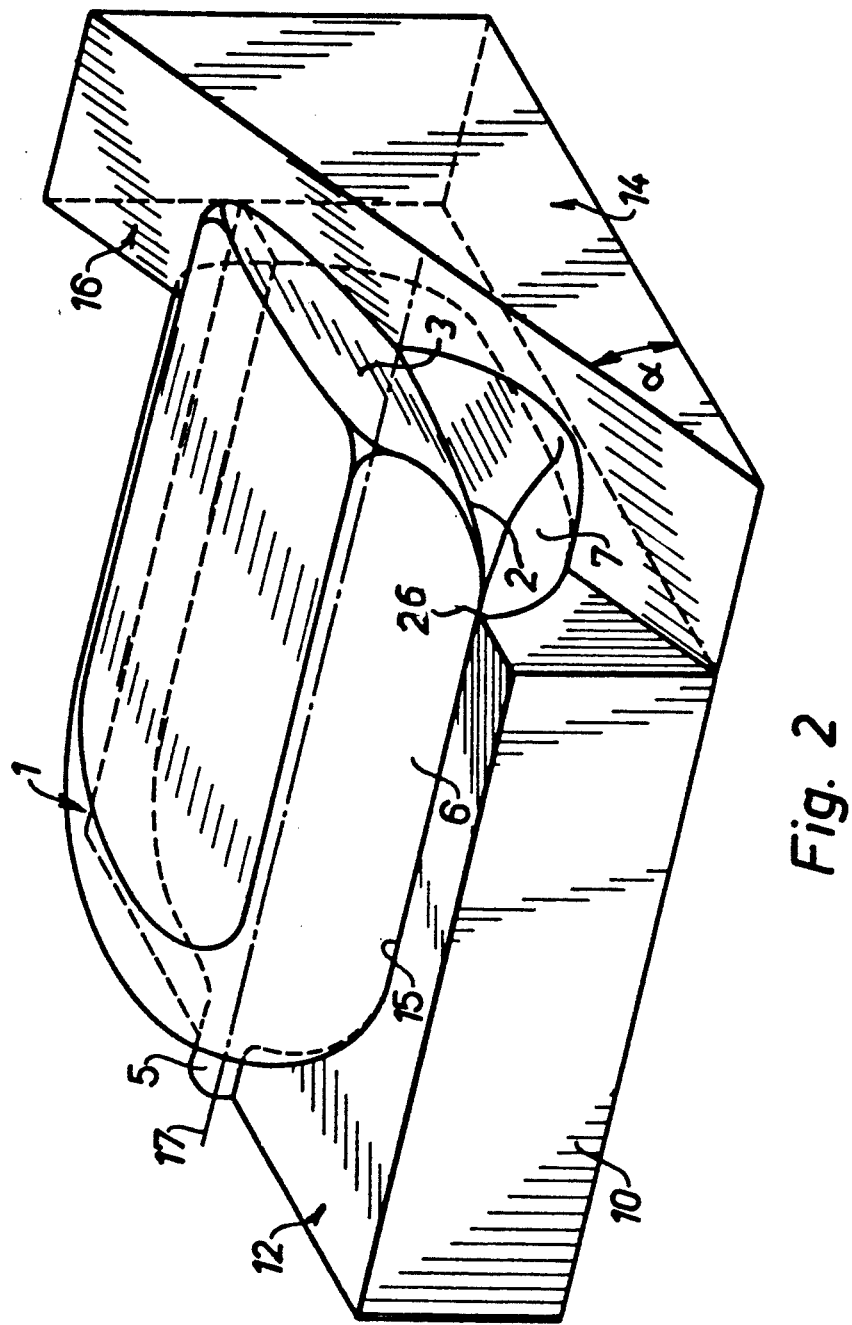
FIG. 2 is a highly schematic, perspective view of one-half of a blow mold, in which a bottle of transparent material is inserted.

Referring first to FIG. 1:

A bottle 1 has a bottom 8, which has a depression 3 formed therein. The depression 3 is generally inverted V-shaped and, at the apex of the V, forms a fold line 2. The bottle has a longitudinal axis 17 (FIG. 2). A fold line 15 is formed in the side walls 13, so that the side walls are divided into two portions which are connected by the fold line 15. The portions define an obtuse angle with respect to each other. The bottom 8—see FIGS. 3 and 4—laterally merges with the side fold lines 15 by a rounded portion—see FIGS. 3 and 4. The ends of the V-shaped depression 3 merges with rounded regions 18, which form the support portions of the bottle when it is standing up (FIG. 1), which rounded portions then continue to form, respectively, the side walls 13 and the transverse side walls 19. The transverse side walls 19, preferably, are bulged outwardly.

To compress the bottle, pressure is exerted, by hand for example, on the lateral side walls 19, so that the bottle can be folded with the side walls 19 engaging each other. The bottom fold edge 2 moves inwardly, and the lateral fold edges 15 move outwardly. Details of this folding process are described in the aforementioned U.S. Pat. No. 5,080,260. A tightly closable cover 4 is coupled to the neck portion of the bottle so that, after folding, no air can enter the bottle and the bottle will remain compressed.

Figure 3:
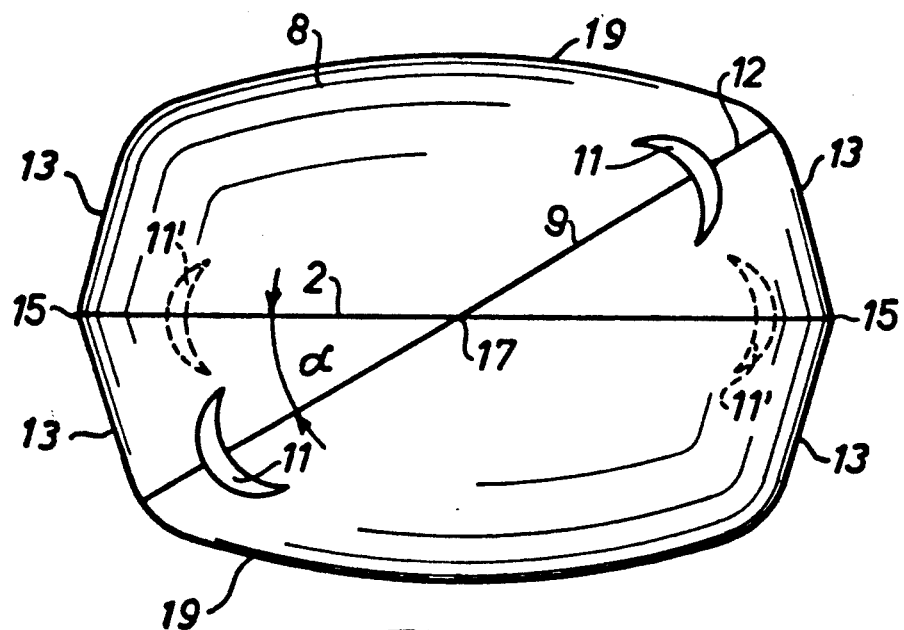
FIG. 3 is an end view of a molded bottle with a straight separating line or seam.
Figure 4:
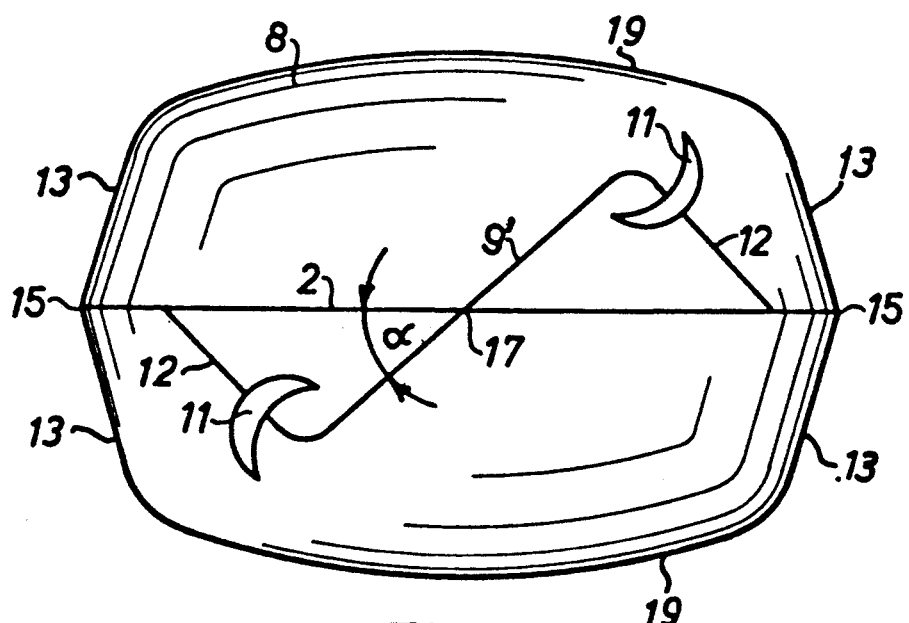
FIG. 4 is an end view similar to FIG. 3, and illustrating a modification of a separating seam which, essentially, is Z-shaped.

In accordance with a feature of the present invention, the seam which arises when the bottle is molded in a blow mold having two separable halves extends at an angle α with respect to the bottom fold line 2, see FIGS. 3 and 4. The angle α, preferably, is in the order of about 20° to 45°.

FIG. 2 illustrates, highly schematically, one-half of a blow mold form. The body 6 of the bottle and the neck portion 5 are retained in the blow mold form which defines a body separating plane 12, passing through the longitudinal plane of the bottle. The fold lines 15 are formed along that longitudinal plane. In addition to the body separating plane 12, a further separating plane 16 of a mold portion 14 is formed which, with respect to the separating plane 12, is inclined by the aforementioned angle α, that is, preferably between about 20° to 45°. The two mold portions 10 and 14 can be unitary or can be separately made and rigidly connected together, depending on manufacturing convenience. The second mold half is mirror-symmetrical and identical, and it can readily be seen that, upon separating the mold halves, the bottle can be readily removed from the mold.

FIGS. 3 and 4 are bottom views from which the position of the separating seam 9 at the bottom of the bottle 8, and, thus, the position of the seam 9 which is formed at the junction of the two mold halves, relative to fold line 2, will be apparent. In FIG. 3, the junction line or seam 9 is straight and extends at a diagonal with respect to the bottom 8 and line 2. It intersects the bottom fold line 9 approximately in the middle, that is, approximately at the position of the longitudinal axis 17 of the bottle. Quarter-moon thickenings 11, as can be seen, will be located outside of the fold line 2, in the vicinity of the region of the bottom where it bears against a support surface, that is, at the stand-up surface of the bottom 8. FIG. 3 also illustrates in broken-line form the thickenings 11', which would arise in prior art bottles, in which the separating plane has been placed, conventionally, in the transverse plane of the bottle, following the separating plane 15. The substantial material thickness directly on the separating plane interferes with and in extreme cases may inhibit folding of the bottle due to the stiffening at the material accumulation regions.

FIG. 4 illustrates another embodiment in which the seam 9' following the separating plane has essentially Z shape. This arrangement is particularly suitable for ease of separation of the mold halves; further subdivisions, that is, additional undulation of the Z shape may be used. The thickened regions 11 are also shown.

Figure 5:
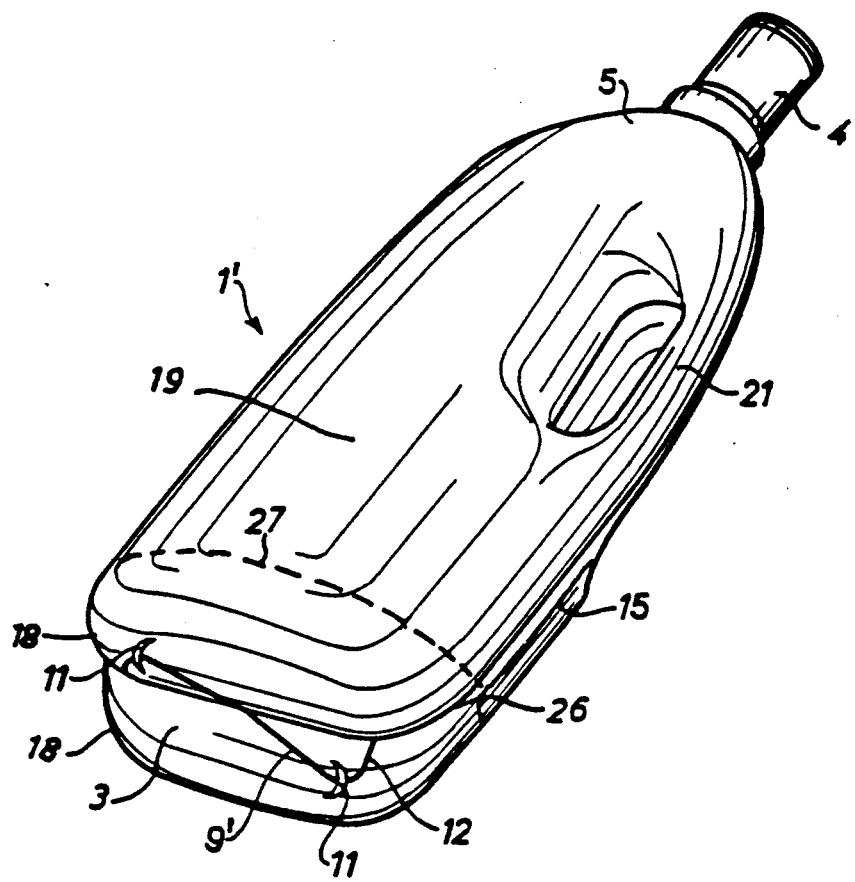
FIG. 5 is a perspective view of the foldable bottle with an inherently molded handle.

Numerous bottles are proposed in which the bottles have a molded-in handle. Referring to FIG. 5: A bottle 1' having a handle 21 is shown. This bottle, also, can be folded in a plane parallel to the plane of the drawing. The bottle of FIG. 5 also is illustrated with a bottom seam 9' which is, essentially, Z-shaped, that is, has the shape illustrated in FIG. 4. The region adjacent the bottom 18 of the bottle, that is, the body and neck region, extends along the separating plane in the longitudinal central plane of the bottle, so that the bottle, as well as the handle, can be separated by the separating seam into two mirror-symmetrical halves. Likewise, the mold fold will have the two mirror-symmetrical halves. The material thickening regions 11, which result from the manufacturing process, are outside of the bottom fold line 2, and approximately in the region of the support surface of the bottom 18, and thus improve the stand-up characteristics of the bottle.

Figure 6:
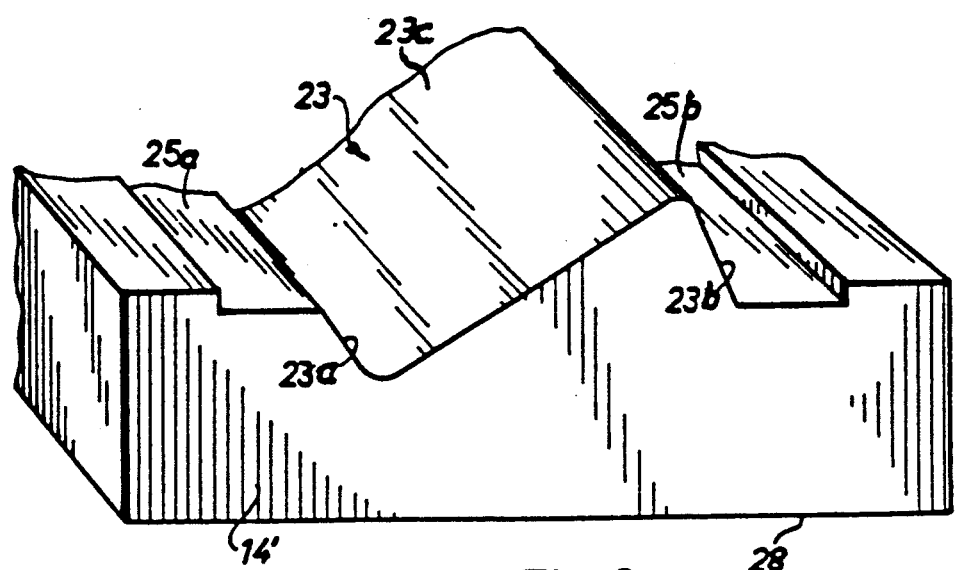
FIG. 6 is a perspective view of a portion of a mold half illustrating the portion when the Z-shaped seam is to be formed, which is illustrated in FIG. 4.

Formation of a Z-shaped seam by two blow molds can be readily obtained by forming the blow molds as shown, schematically, in FIG. 6. The blow mold portion 14 of FIG. 2 is replaced by the portion 14' of FIG. 6. Rather than having a straight line separating plane 16, and as best seen in FIG. 6, a Z-shaped further surface 23, with portions 23a, 23b, 23c, is provided which portions laterally merge with flat separating surfaces 25a, 25b, extending parallel to a base support surface 28. The blow mold portion 10, with the body separating surface 12 (FIG. 2) then is joined by the portion 14'. The extension of the portion 14, or 14', respectively, in the longitudinal direction of the bottle terminates generally at the location 26 (FIG. 5), that is, generally at the position where the rounding or bending of the bottom 18 and of the bottom fold line 2 merges with the lateral fold lines 15, to form a continuous stepless seam 27, shown in broken lines in FIG. 5.

If the separating plane is placed transversely to the plane including the bottom seam 2 in the fold line 15, material accumulation may result at inconvenient locations on the bottom 8. The feature of the present invention of placing the separating plane of the molds, and hence the separating seam at an angle of between 20° to 45° with respect to the bottom fold line, is then equally appropriate. For some bottles, the angle may be increased above 45°, for example up to about 70°, in dependence on the size of the bottle, the width of the bottle, and requirements for reliable stand-up characteristics.

Various changes and modifications may be made within the scope of the inventive concept, and any features disclosed herein may be used with either embodiment.

I claim:

1. Foldable, blow-molded bottle (1, 1') of plastic material defining a bottle axis (17), and having
   a neck portion (5);
   a body portion (6);
   a longitudinal separating seam (15) extending longitudinally in a separating plane which includes said bottle axis (17) along the body portion and the neck portion;
   a bottom portion (8) merging with and connected to the body portion (6),
   wherein the bottom portion (8) is formed with a generally V-shaped depression (3), and in which the apex of the V defines a bottom fold line (2), said bottom portion having a bottom supporting seam, wherein, in accordance with the invention,
   the bottom separating seam (9) in the bottom portion (8) extends at an angle α with respect to the bottom fold line (2), which angle is other than 0°; or 90°; and
   a central region of the bottom separating seam (9) intersects, at least approximately, the bottle axis (17) at a central region of the bottom fold line (2), whereby the bottom seam (9) and the bottom fold line (2) are non-congruent and material accumulation (11) upon blow-molding the bottle will occur remote from the bottom fold line (2).

2. The bottle of claim 1, wherein the bottom seam (9) in the bottom portion (8) of the bottle extends approximately diagonally with respect to the bottom portion.

3. The bottle of claim 1, wherein the bottom seam (9) in the bottom (8) of the bottle extends in an approximately diagonal line across the bottom (8).

4. The bottle of claim 1, wherein the bottom seam (9') in plan view, is generally Z-shaped and has a central portion extending approximately diagonally across the bottom fold line (2) of the bottle, and two end portions extending from the central region of the Z-shaped seam towards the bottom fold line (2).

5. The bottle of claim 4, wherein the at least some of the portions of the bottom seam (9) in the bottom (8) of the bottle extend at least in part diagonally, at said angle α with respect to the bottom fold line (2).

6. The bottle of claim 5, wherein the central portion of the bottom seam (9) extends at said angle (α) with respect to the bottom fold line (2).

7. The bottle of claim 1, wherein the angle α of the bottom seam (9) with respect to the bottom fold line (2) is between about 20° to 45°.

8. A blow mold form for blow-molding the bottle as claimed in claim 1,
   said blow mold form comprising two matching, fitting parts which, when coupled together, define a cavity (10) which, upon blow-molding, will form said bottle;
   each one of said blow mold forms defining a body separating plane (12) which extends in a longitudinal direction of the bottle through which said bottle axis (17) passes;
   said blow mold form, in accordance with the invention, including at least one further separating plane (16, 23) in the region of the bottom (8) of the bottle, said further separating plane forming an angle α with respect to the bottle separating plane (12); and
   wherein imaginary extensions of the bottle separating plane (12) and the further separating plane (16, 23) intersect at least approximately in the longitudinal axis (17) of the bottle.

9. The form of claim 8, wherein said further separating plane forms a generally smoothly diagonally extending plane.

10. The form of claim 8, wherein said further separating plane (23), in end view, is approximately Z-shaped, and has a central portion which intersects said axis (17) of the bottle, and two end portions which are angled in opposite direction with respect to said angle α.

11. The form of claim 8, wherein said angle (α) is other than 0° or 90°.

12. The form of claim 8, wherein the cavity includes a cavity portion for molding a handle on the body portion of the bottle.

13. The form of claim 12, wherein said cavity portion for blow-molding the handle is located substantially in a longitudinal plane which includes said separating seam (15) and the bottle axis (17).

14. The bottle of claim 1, further including a handle (21) formed on the bottle portion.

15. The bottle of claim 14, wherein the handle is located substantially in a longitudinal plane including the separating seam (15) and the bottle axis (17).

16. A method to make a plastic bottle as claimed in claim 1,
   utilizing an extrusion blow-molding process, comprising
   providing a two-part separable blow mold, each of said separable blow mold parts having a cavity (10) to form the body portion (6) of the bottle, a body separating plane (12) in the region of the body (6) of the bottle, and a further separating plane (16, 23) in the region of the bottom (8) of the bottle, wherein said further separating plane forms an angle α with respect to said body separating plane and a theoretical extension of the two separating planes (12; 16, 23) intersect, at least approximately, at the longitudinal axis (17) of the bottle,
   said method comprising the steps of
   introducing a tubular moldable element into said two-part separable blow molds, introducing compressed air, while heating the blow mold, whereby, upon thus forming the bottle in the blow mold, material accumulation (11) at outer end portions of the further separating planes will be positioned remote from a central fold line (2) extending transversely across the bottom (8) of the bottle.

17. The method of claim 16, wherein the cavities (10) of each of said separable blow-mold parts have a cavity portion dimensioned, shaped and positioned to form a handle on the body portion of the bottle.

18. The method of claim 17, wherein said cavity portion is located substantially in a longitudinal plane including said separating seam (15) and the bottle axis (17).

19. The method of claim 17, wherein said angle (α) is other than 0° or 90°.

20. The method of claim 16, wherein said angle (α) is other than 0° or 90°.

* * * * *